United States Patent [19]

Lopez et al.

[11] Patent Number: 5,448,395
[45] Date of Patent: Sep. 5, 1995

[54] NON-MECHANICAL STEP SCANNER FOR ELECTRO-OPTICAL SENSORS

[75] Inventors: Marco A. Lopez, Villa Park; Lawrence Scherr, Altadena; Neil R. Nelson, Anaheim, all of Calif.

[73] Assignee: Northrop Grumman Corporation, Los Angeles, Calif.

[21] Appl. No.: 101,194

[22] Filed: Aug. 3, 1993

[51] Int. Cl.⁶ ............... G02B 26/08; G02B 27/10; H01J 3/14
[52] U.S. Cl. .................... 359/224; 359/626; 250/208.1
[58] Field of Search ........ 359/224, 196, 197, 618–621, 359/626, 741, 744, 399, 400, 463, 19–20, 565; 250/208.1, 208.3

[56] References Cited

U.S. PATENT DOCUMENTS

| | | | |
|---|---|---|---|
| 4,383,170 | 5/1983 | Takagi et al. | 250/208.1 |
| 4,585,948 | 4/1986 | Schneider et al. | 359/619 |
| 4,879,602 | 11/1989 | Glenn | 359/224 |
| 5,212,582 | 5/1993 | Nelson | 359/224 |

*Primary Examiner*—Paul M. Dzierzynski
*Assistant Examiner*—James Phan
*Attorney, Agent, or Firm*—Terry J. Anderson; Karl J. Hoch, Jr.

[57] ABSTRACT

A non-mechanically scanned optical sensor system includes a stationary sensor array having an image plane, a lens system characterized by a field of view corresponding to image of a scene viewed by the lens system, an image divider for dividing the image into plural contiguous sub-images and a device for directing each of the sub-images onto substantially the entirety of the image plane of the sensor array. The directing device in one embodiment is an array of small lenses coextensive with respective light beams of respective sub-images of an image viewed by the lens system. In another embodiment, both the image divider and the directing device are realized together as an X-Y addressable array of electrically deformable optical elements, such as silicon micro-mirrors, individually directing respective ones of the sub-images to the sensor array. In another embodiment, the image divider is a spatial light modulator having an array of optical shutters controlling respective sub-images.

32 Claims, 2 Drawing Sheets

NON-MECHANICAL STEP SCANNER FOR ELECTRO-OPTICAL SENSORS

BACKGROUND OF THE INVENTION

1. Technical Field

The invention is related to electro-optical sensors which scan a field of view, and in particular to electro-optical sensors which view a scene through a wide-field-of-view objective lens corresponding to a focal plane larger than the sensor array.

2. Background Art

Electro-optical (E-O) sensors, particularly those useful for sensing infrared images, typically contain either a linear array on the order of 128 image-sensing elements (photosensitive diodes) or a planar array of 128 rows and 128 columns of such image-sensing elements. Hereafter, such image-sensing elements will be referred to herein as "pixels". The problem with such sensors is their small size, particularly whenever they are used in conjunction with a viewing lens having a very wide field of view (FOV). The image plane of such lenses corresponding to the very wide field of view is larger than the sensor. In order to capture the entire FOV of such a lens, a mechanical scanner (a gimballed mirror) is employed to compensate for the small size of the sensor. The scanner causes the sensor to view, in succession, small sub-sections of the entire image until the whole image has been captured and stored. One persistent problem with such systems is that the scanner's mechanical components (the mirror gimbal transmission and motor) is the least reliable component of the entire system.

It would not be feasible to discard the mechanical scanning of the system. To do so would require that the entire wide-FOV image be focussed onto the E-O sensor array, which would greatly reduce the resolution of the image recorded by the sensor. Otherwise, a major portion of the wide-FOV image would fall outside the sensor array and be lost. Alternatively, a very large E-O sensor array could be employed, but such large arrays are prohibitively expensive for purchase in large quantities. Thus, for inexpensive E-O sensor arrays (on the order of 128-by-128 pixels), mechanical scanning seems to be an unavoidable necessity.

Wide FOV lenses and optical field flatteners therefor are known in the art, as disclosed in U.S. Pat. Nos. 3,961,844 and 4,772,107. Spatial light modulators (SLM's) are used in the art by having each pixel of the SLM control a respective pixel of an image. This technique is disclosed in U.S. Pat. No. 4,948,258 for ranging systems and in U.S. Pat. Nos. 5,132,813 and 5,056,039 for optical interconnects for processors or computing systems.

What is needed is a way of using a relatively small E-O sensor to capture the entire field of view of a wide-field-of-view lens without requiring a mechanical scanner such as a gimballed mirror.

SUMMARY OF THE DISCLOSURE

The invention is a non-mechanically scanned wide-FOV E-O sensor system in which the relatively large image plane of a wide-FOV lens is electronically scanned by a smaller stationary E-O sensor array without the use of any mechanical moving parts. The scanning is accomplished by the combination of a spatial light modulator (SLM), which is an array of optical shutters, and an array of small lenses disposed in the optical path between the wide-FOV lens and the E-O sensor array. Each of the small lenses is focussed onto the stationary E-O sensor and is aligned with a respective shutter of the SLM. The SLM divides the image of the wide-FOV lens into contiguous small sub-images controlled by respective shutters, each sub-image being focussed onto the E-O sensor array by a respective one of the small lenses. Each of the small lenses focusses the corresponding sub-image onto the same image plane coincident and co-extensive with the E-O sensor array, so that each sub-image is completely and instantly captured by the stationary E-O sensor array. In the preferred mode of operation, the SLM is controlled so as to open each shutter one-at-a-time, so that the E-O sensor views each sub-image in succession. An image processor can store each sub-image received by the sensor in succession and then construct a high-resolution mosaic of all the received sub-images representing the wide-FOV image viewed by the lens.

A key advantage is that the size of the sub-images can be selected to correspond to the size of the E-O sensor array, so small E-O sensor arrays can be employed. The resolution for a given sensor array size is readily increased by increasing the number of sub-images into which the wide-FOV is divided, requiring an SLM with a larger number of shutters. Thus, there is no trade-off between sensor array size and resolution, which overcomes a fundamental limitation of the prior art.

The invention may be employed to automatically search for features within the image having a brightness greater than a selected threshold. In this search mode, the invention continues to open successive SLM shutters one-at-a-time until it senses that the threshold brightness has been exceeded in a particular sub-image, at which point the corresponding SLM shutter is held open for analysis of the sub-image.

In an alternative search mode, the system instantly senses whenever a feature having a brightness exceeding the leakage threshold of the SLM is present in any sub-image even while the corresponding SLM shutter is closed. In this case, the system automatically searches for the corresponding sub-image.

In an alternative embodiment, the E-O sensor is replaced by a light source and (optionally) a test pattern template. The SLM is then operated to illuminate different portions of a sensor under test held close to the wide-FOV lens.

The SLM can be implemented in a number of different technologies, such as diffusive liquid crystals or silicon micro-mirrors. The array of small lenses may be implemented as simple lenses, compound lenses, diffractive (holographic) lenses. Alternatively, the same silicon micro-mirrors may perform the functions of both the SLM and the array of small lenses.

DETAILED DESCRIPTION OF THE PREFERRED EMBODIMENTS

Figure 1:
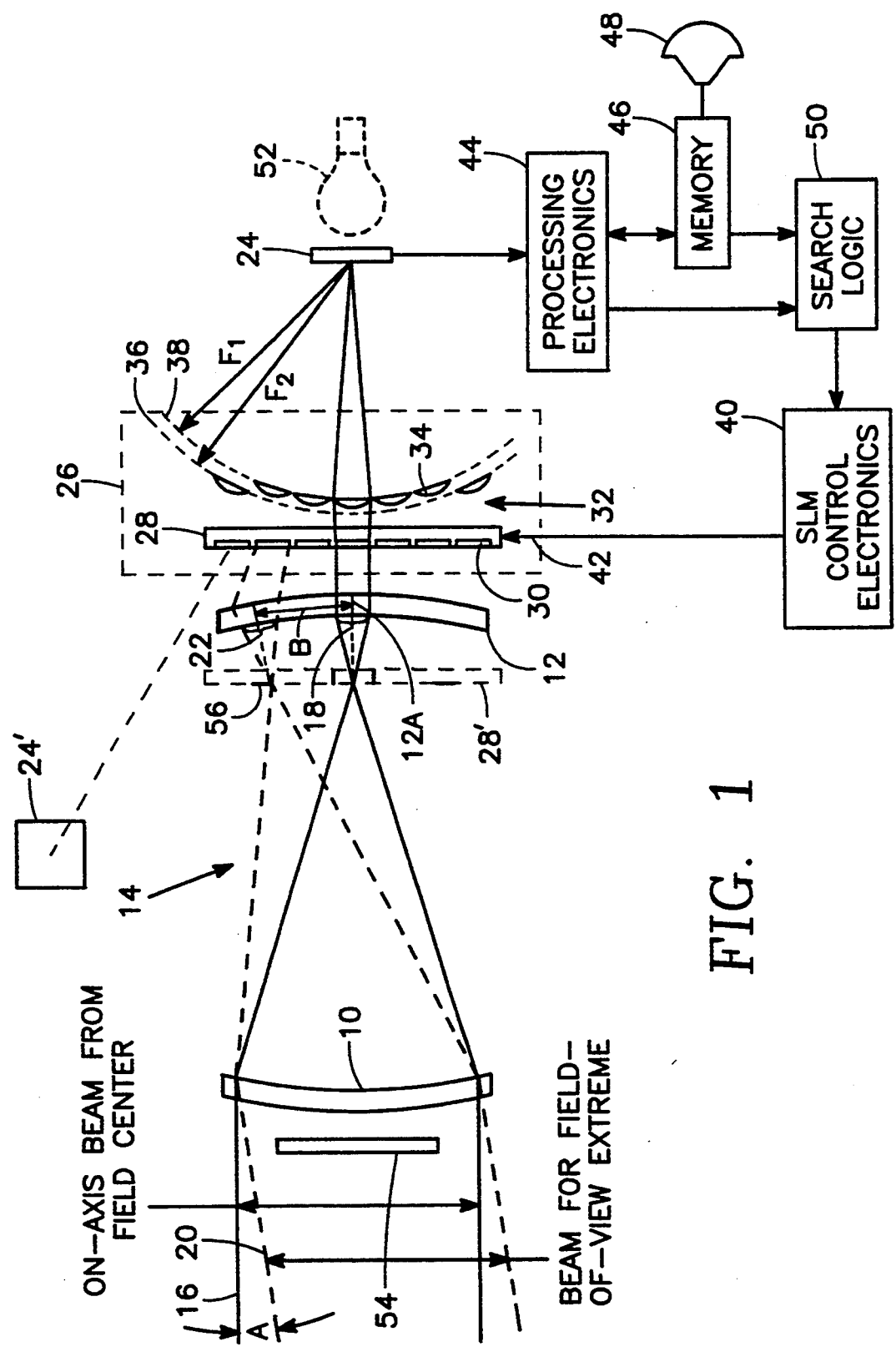
FIG. 1 is a diagram of an optical system embodying the invention.

Referring to FIG. 1, a wide-FOV objective lens 10 and an eye-piece lens 12 form a telescopic lens system 14. An "on-axis" light beam 16 (solid lines) passing through the objective lens (along its axis of symmetry) is focussed onto the center region 18 of the eye-piece lens 12. An "off-axis" light beam 20 (dashed lines), corresponding to the limit of the FOV of the wide-FOV objective lens 10, is focussed onto a peripheral region 22 of the eye-piece lens 12. The off-axis angle of a beam relative to the objective lens 10 determines the displacement of the beam's intersection with the eye-piece lens from the center of the eye-piece lens. In fact, a relationship is readily computed between the angle of the beam "A" relative to the axis of symmetry of the objective lens 10 and the displacement "B" between the center of the beam on the eye-piece lens and the center 12A of the eye-piece lens 12.

A standard E-O sensor array 24, such as a two-dimensional array having on the order of 128 columns and 128 rows of pixels, receives light from the eye-piece lens through an image-dividing and focussing device 26. The image-dividing and focussing device 26 divides the light beam passing through the eye-piece lens 12 into a mosaic of plural contiguous sub-image light beams representing plural sub-images. Furthermore, the image-dividing and focussing device 26 directs or focusses each sub-image light beam onto the sensor array 24. Preferably, for maximum resolution, each sub-image light beam is focussed onto an image plane which is co-extensive with the sensor array 24. This ensures that all of the pixels of the sensor array 24 are used to resolve the corresponding sub-image. This further ensures that none of the corresponding sub-images is lost outside of the sensor array 24. In addition, the image-dividing and focussing device 26 can direct any selected one of the sub-images onto the sensor array 24 while blocking all other sub-images, so that the sensor array 24 can view each sub-image sequentially, in accordance with suitable electronic control commands. Thus, by storing each sub-image detected by the sensor array 24, a high-resolution mosaic of the entire received image can be obtained without any mechanical scanning or moveable parts.

The optical characteristics of the image-dividing and focussing device 26 are selected in accordance with basic optical design principles so that the sub-image beam size as focused onto the sensor array 24 conforms with the boundaries of the sensor array 24. Thus, the resolution can be optimized for any size sensor array regardless of how wide the field of view of the objective lens 10 may be, a significant advantage.

Figure 3:
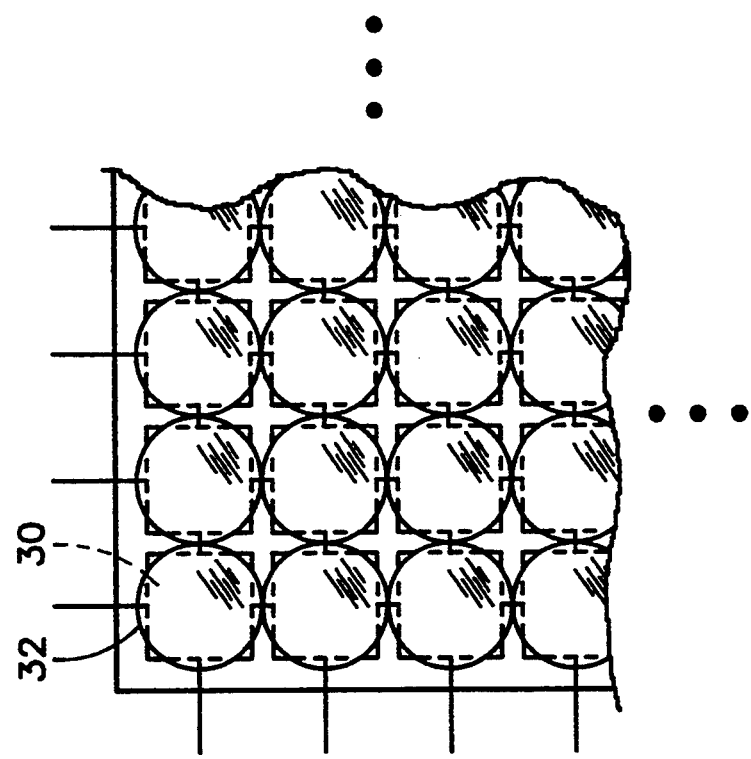
FIG. 3 is a simplified front view of an array of small mirrors aligned with the SLM of FIG. 2 as employed in the optical system of FIG. 1.
Figure 2:
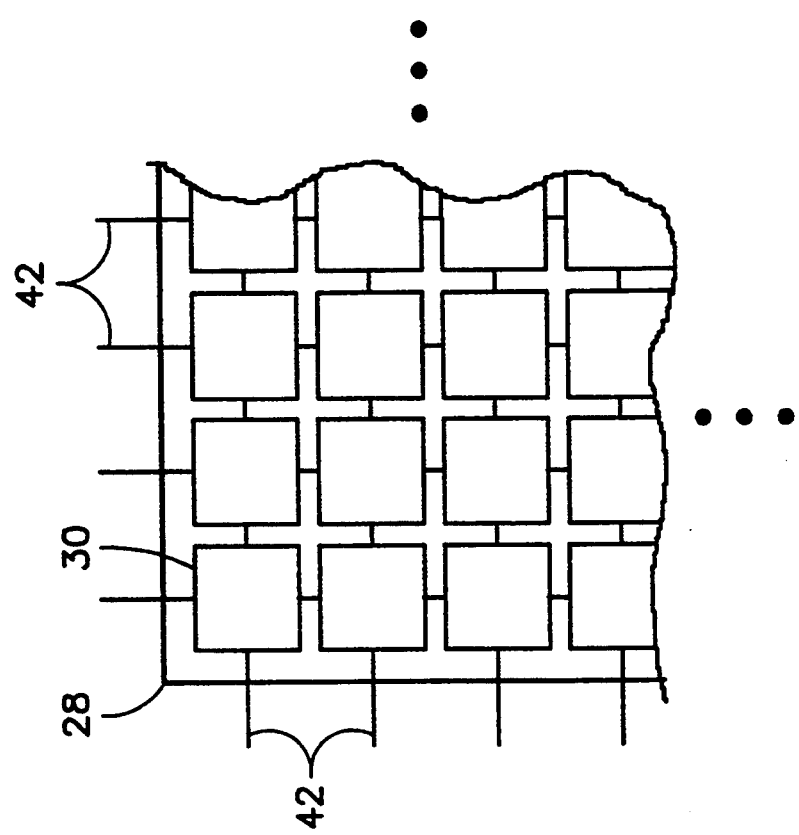
FIG. 2 is a simplified front view of an SLM employed in the optical system of FIG. 1.

In the embodiment of FIG. 1, the image-dividing and focussing device 26 is an SLM 28 having plural shutters 30 (best shown in FIG. 2) facing an array 32 of small lenses or "lenslets" 34 (best shown in FIG. 3). Each one of the plural shutters 30 corresponds to a respective sub-image and its extent defines the corresponding sub-image light beam. The corresponding lenslet focuses that sub-image light beam onto the sensor array 24. In this particular embodiment, each lenslet 34 is centered in the optical path of a corresponding shutter 30 at one of two respective spherical surfaces 36, 38 centered at the plane of the detector 24 and having a focal length $F_1$, $F_2$ equal to the radius of the corresponding spherical surface 36, 38.

Referring to FIG. 3, each lenslet 34 fits with its neighboring lenslets so that there are no optical gaps between the lenslets 34. Each lenslet is optically centered on a respective one of the shutters 30 so as to capture all of the light passing therethrough and focus it onto the plane of the detector 24. The size of the shutters 30 is selected so that the lenslets focus the light or sub-image therefrom onto an image plane corresponding to the extent of the sensor array 24, so that the maximum resolution is provided for each sub-image.

The resolution is readily increased without any change in the sensor array 24 by increasing the number of sub-images into which the image is divided, with an attendant decrease in size of the shutters 30. Such a decrease in shutter size requires a corresponding change in the characteristics of the lenslets 34 to keep the sub-images co-extensive with the sensor array 24.

In the preferred mode of operation, the shutters 30 are opened sequentially so that the sensor array 24 views only one sub-image at any one time, under the control of SLM electronics 40 and X-Y address SLM conductors 42.

In an image reconstruction mode of operation, processing electronics 44 sequentially receives each sub-image (in the form of analog signals) from the sensor array 24 and stores the corresponding sub-images in a memory 46. The memory 46 is then down-loaded to a display device 48 to form a mosaic of all sub-images as a high-resolution full image of the scene viewed by the wide-FOV lens 10.

In accordance with one feature of the invention, search logic 50 controls the SLM electronics 40 and determines from the sub-images viewed by the sensor array 24 whether the average brightness of any sub-image exceeds a selected threshold. In this mode, all of the shutters are held open. If the threshold if exceeded, the search logic 50 determines which sub-image it is by sequencing the SLM electronics 40 to close successive individual shutters 30 (or groups thereof, for a faster search) until the corresponding sub-image is isolated. (Alternatively, one may first close all of the shutters and then sequentially open selected shutters or groups thereof.) The corresponding sub-image is found by detecting which sub-image contains a feature having a brightness exceeding the threshold. For this purpose, the processing electronics 44 (or, alternatively, the search logic 50) computes the average brightness of each received sub-image and compares it with a threshold brightness level to determine whether the average brightness exceeds the threshold. If so, then the search logic 50 designates the corresponding shutter 30 as framing the sub-image of interest, and causes that shutter to be held open for analysis of the sub-image while the remaining shutters are held closed.

Even when a shutter 30 is closed, there is a brightness leakage threshold at which light from a particularly bright feature in one of the sub-images will leak through the closed shutter 30. One example of such a bright feature would be a powerful laser source such as a laser target designator. If such a bright feature is encountered, it will be detected whether or not the corresponding shutter is opened at the time. As a result, the search logic 50 detects an over-threshold brightness condition even before the corresponding shutter 30 is opened. Thus, the system may be considered to be in a search mode for super-bright features even when the SLM is being operated in the "mosaic" mode of sequentially opening individual shutters 30 rather than in the previously described search mode in which all shutters 30 are held open simultaneously.

In an alternative embodiment, the spatial light modulator 28 is removed and an identical spatial light modulator 28' is placed at an intermediate image plane 56 between the objective lens 10 and the eye-piece lens 12. While the spatial light modulator 28' is shown in FIG. 1 as having a straight-line cross-section, it should follow the contour of the image plane 56, which may be in fact curved, depending upon the characteristics of the lenses 10, 12.

In another embodiment of the invention, a light source 52 is held near the sphere center and the sensor array 24 is replaced by a test image template. An optical sensor to be tested 54 is then placed near and facing the objective lens 10. The logic 50 then operates the SLM control electronics 40 to open individual shutters 30 so as to rapidly illuminate different portions of the sensor 54 with the same test image. The advantage is that a sensor can be rapidly and precisely characterized automatically.

While the invention has been described in detail by specific reference to preferred embodiments, it is understood that variations and modifications thereof may be made without departing from the true spirit and scope of the invention.

What is claimed is:

1. An electronically-scanned electro-optical sensor system, comprising:
   a telescopic lens system having an objective lens and an eyepiece lens, said telescopic lens system being characterized by a field of view corresponding to an image of a scene viewed by said telescopic lens system and defining an optical path of said sensor system;
   means positioned in said optical path for dividing said image into a plurality of contiguous sub-images, a number of said sub-images being selected in accordance with a desired resolution of said sensor system;
   a sensor array positioned in said optical path, said sensor array having an image plane and receiving at least one of said sub-images, a size of said sensor array being selected independently of said number of sub-images; and,
   means positioned in said optical path between said telescopic lens system and said sensor array for focussing each of said sub-images onto said image plane of said sensor array.

2. The sensor system of claim 1 wherein said means for focussing each of said sub-images onto said image plane of said sensor array comprises an array of small lenses coextensive with respective light beams of respective sub-images of said image viewed by said telescopic lens system.

3. The sensor system of claim 2 wherein said array of small lenses is positioned in said optical path between said telescopic lens system and said sensor array, and is configured in a partial spherical surface co-axial with said telescopic lens system and centered in said image plane of said sensor array, said partial spherical surface having a convex side facing said telescopic lens system and having a concave side facing said sensor array.

4. The sensor system as claimed in claim 2, wherein said small lenses comprise at least one of simple lenses, compound lenses, and diffractive lenses.

5. The sensor system of claim 1 wherein said means for dividing comprises an array of electrically deformable optical elements individually directing respective ones of said sub-images onto said image plane of said sensor array, and means for electrically addressing individual ones of said electrically deformable optical elements.

6. The sensor system of claim 5 wherein said electrically deformable optical elements comprise silicon micro-mirrors, and wherein further said respective sub-image are reflectable by said silicon micro-mirrors onto said image plane of said sensor array.

7. The sensor system as claimed in claim 1, wherein said means for dividing is positioned in said optical path at an intermediate image plane of said telescopic lens system between said objective lens and said eyepiece lens.

8. The sensor system as claimed in claim 1, wherein said means for dividing is positioned in said optical path between said telescopic lens system and said means for focussing.

9. The sensor system of claim 1 wherein said means for focussing said sub-images onto said image plane of said sensor array comprises an array of electrically deformable optical elements individually directing respective ones of said sub-images onto said image plane of said sensor array, and means for electrically addressing individual ones of said electrically deformable optical elements.

10. The sensor system of claim 9 wherein said electrically deformable optical elements comprise silicon micro-mirrors, and wherein further said respective sub-images are reflectable by said silicon micro-mirrors onto said image plane of said sensor array.

11. The sensor system as claimed in claim 1, wherein said means for dividing further comprises means for selecting ones of said sub-images for focussing onto said image of said sensor array plane and for blocking others of said sub-images from being focussed onto said image plane of said sensor array.

12. The sensor system of claim 11 wherein said means for dividing said image comprises a spatial light modulator having an array of optical shutters in said optical path of said telescopic lens system, each of said optical shutters corresponding to a respective one of said sub-images, and wherein further said means for selecting comprises means for opening at least one of said optical shutters while maintaining a remainder of said optical shutters closed.

13. The sensor system as claimed in claim 12, wherein said optical shutters comprise diffusive liquid crystals.

14. The sensor system as claim in claim 12, wherein said optical shutters comprise silicon micro-mirrors.

15. The sensor system of claim 11 wherein said means for dividing said image further comprises search logic means for controlling said means for selecting, said search logic means for controlling comprising:
   means for causing all of said sub-images to be viewed simultaneously by said sensor array; and
   means for causing said sub-images to be blocked from said image plane of said sensor array while sequentially admitting selected ones of said sub-images to said image plane of said sensor array in response to a presence of a feature in said selected ones of said sub-images having a feature brightness exceeding a predetermined threshold.

16. The sensor system of claim 11 wherein said means for selecting has a brightness leakage threshold, said system further comprising:

search logic means for searching said sub-images for a bright sub-image containing a feature having a brightness exceeding said brightness leakage threshold whenever said feature having said brightness exceeding said brightness leakage threshold is sensed while viewing any of said sub-images.

17. An optical sensor system, comprising:
a stationary sensor array having an image plane;
a telescopic lens system, said telescopic lens system including an objective lens and an eyepiece lens and being characterized by a field of view corresponding to an image of a scene viewed by said telescopic lens system; and,
means for electronically scanning said sensor array across said field of view, comprising
electro-optical means for dividing said image into plural contiguous sub-images, a number of said sub-images being selected in accordance with a desired resolution of said sensor system and independently of a size of said sensor array and
electro-optical means for directing each of said sub-images onto said image plane of said sensor array.

18. The sensor system of claim 17 wherein said means for directing each of said sub-images onto said image plane of said sensor array comprises an array of small lenses co-extensive with respective light beams of respective sub-images of said image viewed by said telescopic lens system.

19. The sensor system of claim 18 wherein said array of small lenses is positioned between said telescopic lens system and said sensor array, and is configured in a partial spherical surface co-axial with said telescopic lens system and centered in said image plane of said sensor array, said partial spherical surface having a convex side facing said telescopic lens system and having a concave side facing said sensor array.

20. The sensor system as claimed in claim 18, wherein said small lenses comprise at least one of simple lenses, compound lenses, and diffractive lenses.

21. The sensor system of claim 17 wherein said means for dividing comprises an array of electrically deformable optical elements individually directing respective ones of said sub-images onto said image plane of said sensor array, and means for electrically addressing individual ones of said electrically deformable optical elements.

22. The sensor system of claim 21 wherein said electrically deformable optical elements comprise silicon micro-mirrors, and wherein further said respective sub-images are reflectable by said silicon micro-mirrors onto said image plane of said sensor array.

23. The sensor system as claimed in claim 17, wherein said means for dividing is positioned at an intermediate image plane of said telescopic lens system between said objective lens and said eyepiece lens.

24. The sensor system as claimed in claim 17, wherein said means for dividing is positioned between said telescopic lens system and said means for directing.

25. The sensor system of claim 17 wherein said means for directing said sub-images onto said image plane of said sensor array comprises an array of electrically deformable optical elements individually directing respective ones of said sub-images onto said image plane of said sensor array, and means for electrically addressing individual ones of said electrically deformable optical elements.

26. The sensor system of claim 25 wherein said electrically deformable optical elements comprise silicon micro-mirrors, and wherein further said respective sub-images are reflectable by said silicon micro-mirrors onto said image plane of said sensor array.

27. The sensor system as claimed in claim 17, wherein said means for dividing further comprises means for selecting ones of said sub-images for direction onto said image plane of said sensor array and for blocking others of said sub-images from being directed onto said image plane of said sensor array.

28. The sensor system of claim 27 wherein said means for dividing said image comprises a spatial light modulator having an array of optical shutters in an optical path illuminated by said telescopic lens system, each of said optical shutters corresponding to a respective one of said sub-images, and wherein said means for selecting comprises means for opening at least one of said optical shutters while maintaining a remainder of said optical shutters closed.

29. The sensor system as claimed in claim 28, wherein said optical shutters comprise diffusive liquid crystals.

30. The sensor system as claimed in claim 28, wherein said optical shutters comprise silicon micro-mirrors.

31. The sensor system of claim 27 wherein said means for dividing further comprises search logic means for controlling said means for selecting, said search logic means comprising:
means for causing all of said sub-images to be viewed simultaneously by said image plane of said sensor array; and
means for causing said sub-images to be blocked from said image plane of said sensor array while sequentially admitting selected ones of said sub-images to said image plane of said sensor array in response to a presence of a feature in said selected ones of said sub-images having a feature brightness exceeding a predetermined threshold.

32. The sensor system of claim 27 wherein said means for selecting has a brightness leakage threshold, said apparatus further comprising:
search logic means for searching said sub-images for a bright sub-image containing a feature having a brightness exceeding said brightness leakage threshold whenever said feature having said brightness exceeding said brightness leakage threshold is sensed while viewing any of said sub-images.

* * * * *